US007222347B2

(12) United States Patent
Kardach

(10) Patent No.: US 7,222,347 B2
(45) Date of Patent: May 22, 2007

(54) METHOD AND APPARATUS FOR PROCESSING REAL-TIME EVENTS ASSOCIATED WITH A WIRELESS COMMUNICATION PROTOCOL

(75) Inventor: James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 09/821,347

(22) Filed: Mar. 29, 2001

(65) Prior Publication Data

US 2002/0143845 A1   Oct. 3, 2002

(51) Int. Cl.
*G06F 9/48* (2006.01)
*G06F 13/24* (2006.01)
*H04M 11/00* (2006.01)

(52) U.S. Cl. .................... 719/318; 718/102; 710/267; 710/260; 455/403; 455/418

(58) Field of Classification Search ........ 718/100–108; 719/310–332; 710/1–317; 455/1–317; 712/1–300
See application file for complete search history.

(56) References Cited

U.S. PATENT DOCUMENTS

| | | | | |
|---|---|---|---|---|
| 5,701,450 A | * | 12/1997 | Duncan | 712/245 |
| 5,708,818 A | * | 1/1998 | Munz et al. | 710/267 |
| 5,742,825 A | | 4/1998 | Mathur et al. | |
| 5,790,676 A | * | 8/1998 | Ganesan et al. | 380/247 |
| 5,925,102 A | | 7/1999 | Eilert et al. | |
| 5,948,065 A | | 9/1999 | Eilert et al. | |
| 5,970,069 A | | 10/1999 | Kumar et al. | |
| H1836 H | * | 2/2000 | Fletcher et al. | 455/433 |
| 6,044,430 A | * | 3/2000 | MacDonald | 710/260 |
| 6,295,574 B1 | * | 9/2001 | MacDonald | 710/261 |
| 6,366,622 B1 | * | 4/2002 | Brown et al. | 375/322 |
| 6,466,962 B2 | * | 10/2002 | Bollella | 718/107 |
| 6,628,965 B1 | * | 9/2003 | LaRosa et al. | 455/557 |
| 6,801,755 B2 | * | 10/2004 | Kardach et al. | 455/41.2 |
| 2002/0055817 A1 | * | 5/2002 | Chou | 701/207 |
| 2003/0120706 A1 | * | 6/2003 | Harjula | 709/104 |

FOREIGN PATENT DOCUMENTS

| | | |
|---|---|---|
| EP | 0927932 A2 | 7/1999 |
| WO | WO 00/36757 | 6/2000 |

OTHER PUBLICATIONS

Corbal, J., et al., "DLP+TLP Processors for the Next Generation of Media Workloads", Jan. 19-24, 2001, pp. 219-228, High-Performance Computer Architecture, HPCA, The Seventh International Symposium On Monterrey, Mexico.

Burleson, W., et al., "The Spring Scheduling Coprocessor: A Scheduling Accelerator", Mar. 1999, pp. 38-47, vol. 7, No. 1, IEEE Transactions On Very Large Scale Integration (VLSI) Systems.

* cited by examiner

*Primary Examiner*—Lewis A. Bullock, Jr.
(74) *Attorney, Agent, or Firm*—Blakely, Sokoloff, Taylor & Zafman LLP

(57) ABSTRACT

A processor may perform real-time event processing of real-time events in a manner that enables a radio module equipped computer system to operate in accordance with a wireless communication protocol using host processor baseband processing. In accordance with one embodiment, the processor may perform real-time event processing by halting a process in response to receiving a real-time event, handling the event, then returning to the process. In accordance with another embodiment, the processor may perform real-time event processing on a non-symetric processing core integrated with a primary host processor core that shares the same L2 cache.

21 Claims, 6 Drawing Sheets

METHOD AND APPARATUS FOR PROCESSING REAL-TIME EVENTS ASSOCIATED WITH A WIRELESS COMMUNICATION PROTOCOL

The present invention relates to computer systems and more particularly to a system including a processor that supports real-time event processing such as may be used to enable the system to function in accordance with a wireless communication protocol.

BACKGROUND

Mobile computer systems, from small handheld electronic devices to application-specific electronic components, such as set-top boxes, to medium-sized notebook and laptop systems, are becoming increasingly pervasive in our society. Unlike their symmetric multiprocessing counterparts, such as server, workstation, and high-end desktop systems, mobile computer systems typically include a single, primary, host processor coupled to various peripheral devices. Computer system designers continually strive to provide more features to users without significantly increasing the cost of the system. Unfortunately, each additional feature typically corresponds to additional components added to the computer system, resulting in increased size and expense.

BRIEF DESCRIPTION OF THE DRAWINGS

The present invention is illustrated by way of example and not limitation in the accompanying figures in which like references indicate similar elements and in which.

DETAILED DESCRIPTION

Figure 1A:
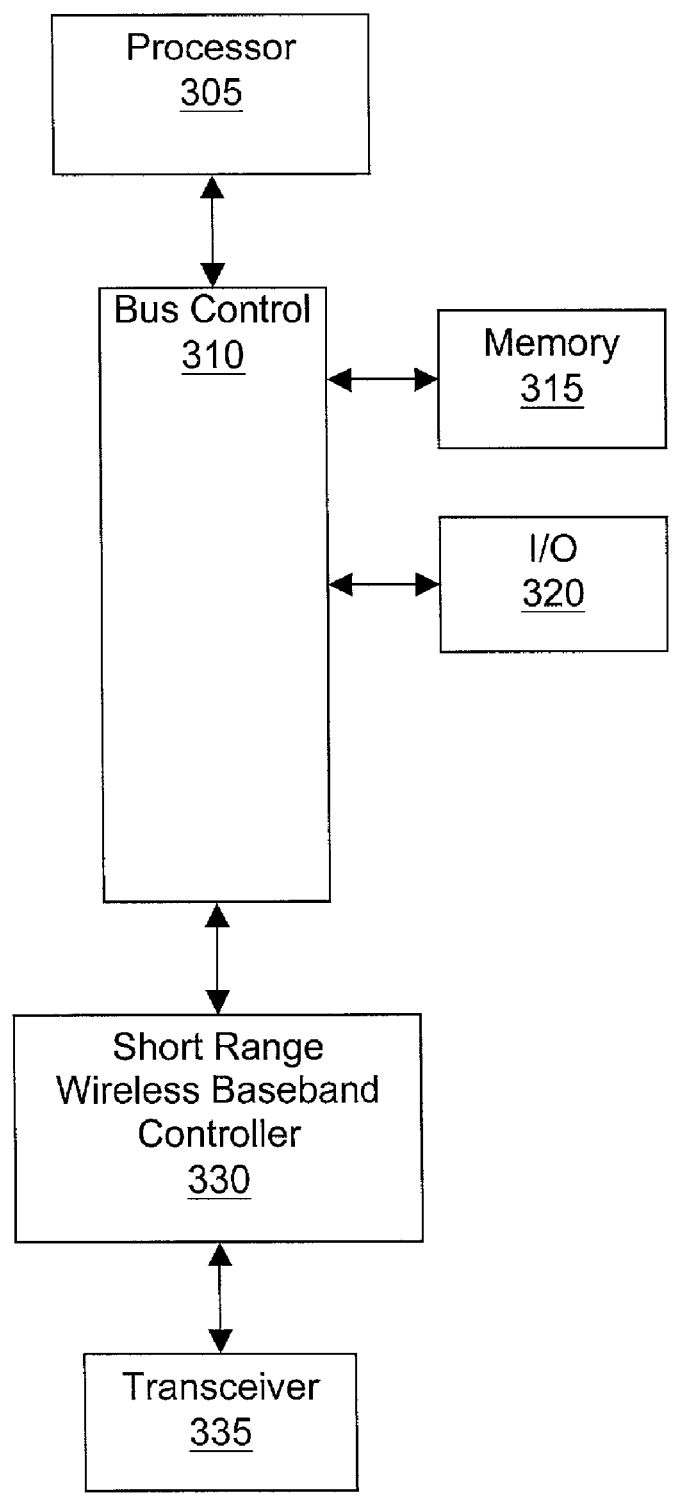
FIGS. 1a–d are systems formed in accordance with embodiments of the present invention.

In accordance with one embodiment of the present invention, a scalable interface (referred to herein as a "harmonized interface") from a host computer system to a wireless radio module is provided. The module meets the legal requirements for an intentional radiator but may not be specific to any given wireless communication protocol. On the other side of the harmonized interface resides a generic protocol engine that can manipulate the wireless module to meet a given wireless communication protocol. Sitting above the protocol engine resides the normal operating system (OS) driver stack that then connects to the different networking and peripheral drivers of the host computer system.

With this type of partitioning, a radio module may be designed to operate in accordance with multiple wireless communication protocols. The harmonized interface may connect this radio module to a host computer system that then performs the high-level baseband processing for the module. By dynamically changing the source code in the host system, different wireless communication protocols may be emulated.

For example a module may be created that that operates in accordance with the Bluetooth* (as described in, e.g., "Specification of the Bluetooth System," v1.0b, Dec. 1, 1999), HomeRF* Shared Wireless Access Protocol (SWAP) (as described in, e.g., "Shared Wireless Access Protocol (SWAP) Specification" v.1.0, Jan. 5, 1999), and IEEE 802.11 (as described in, e.g., "IEEE Std 802.11" 1999 Edition) protocols. The protocol may be changed dynamically depending on the environment of the user (e.g. on the road, in the office, or at home). In addition to these short-range wireless communication protocols, long-range wireless communication protocols may also be emulated, such as a Third Generation (3G) cellular communication protocol, given the appropriate module attached to the harmonized interface.

(*Trademarks and brands are the property of their respective owners.)

By partitioning the baseband correctly, such a design may also allow the host processor of the host computer system to perform some of the higher level baseband processing. Using the harmonized interface, a host processor of a computer system may perform baseband processing functions natively, thereby reducing the cost of the system by reducing the need for separate, specialized processing hardware to support the radio module. To perform these functions, the host processor may include enhancements over conventional processors that enable the host processor to process real-time events, such as those associated with wireless communication protocols.

A more detailed description of embodiments of the present invention, including various configurations and implementations, is provided below.

The Wireless Module

Although much of the following discussion focuses on Bluetooth technology, including the Bluetooth baseband, it is to be appreciated that the concepts discussed herein may be more broadly applied to nearly any wireless communication protocol and its respective baseband.

Current partitioning of a wireless Bluetooth module follows the silicon technology used for the implementation. The radio frequency (RF) analog portion of a Bluetooth module is typically manufactured using a BI-CMOS process, and resides in one device (e.g. the transceiver). The remaining micro-controller section is typically manufactured using a CMOS process, and resides in a separate device, referred to herein as the short range wireless baseband controller.

The Bluetooth system is based on radio technology. Consequently, compliance with a number of country-specific regulatory requirements may be important for the success of the Bluetooth protocol. These requirements are normally tracked by a government agency, including, for example, the Federal Communications Commission (FCC) in the United States and the Ministry of Posts and Telecommunications (MPT) in Japan. Their requirements dictate how a compliant radio is to behave within their respective country. After a product to be sold has been assembled, it is sent to a government agency-approved testing facility to be tested and certified. After this testing is complete (which may take two months or more) and the product is certified, the product may then be sold in that country's markets.

To speed up product introduction of such devices, a process called Declaration of Compliance (DoC) has been created. This process allows a company to pre-certify a device based on the fact that it is assembled with pre-tested (and pre-certified) components. Building a device using a pre-certified component allows a company to self-certify their final product through the DoC process. In the United States, to achieve pre-certification of a wireless module, the module may be expected to meet the requirements of Limited Modular Approval (LMA) as described in the FCC publication entitled "Part 15 Unlicensed Modular Transmitter Approval" published Jun. 26, 2000.

In accordance with one embodiment of the present invention, a radio module is provided that meets the FCC's LMA requirements such that an OEM can use the DoC process to self-certify their end-user products incorporating the module. This removes from the product development cycle the FCC radio certification process normally associated with integrating an intentional RF radiator into a product. Current DoC requirements for LMA extend up through the equivalent of the Bluetooth Link Management Protocol, and because of the present manufacturing-based partitioning described above, a radio module, to obtain LMA, may contain the entire Bluetooth baseband.

For example, consider the computer system of FIG. 1a comprising processor 305, memory 315, and input-output (I-O) device 320 coupled to bus control logic 310 (which is typically the system chipset). Short range wireless baseband controller 330 contains the logic associated with the full baseband, e.g. the Bluetooth baseband, used to operate transceiver 335. In other words, baseband controller 330 contains all the logic used to support the full baseband of a wireless communication protocol. In addition, controller 330 contains bus interface logic used to communicate with bus control logic 310 of the chipset and with transceiver 335.

Based on this partitioning, a module that meets the requirements for LMA would contain both transceiver 335 and short range wireless baseband controller 330 of FIG. 1a. An upgrade or other modification to the baseband, contained within controller 330, may therefore require re-certification of such a module. In addition, such a module leaves little if any of the baseband processing to be implemented by the host computer system, thereby increasing system costs. Alternatively, integration of controller 330 into the host computer system would cause what is left-over, transceiver 335, to not be subject to the DoC process because it would not meet LMA requirements.

In accordance with an embodiment of the present invention, short range wireless baseband controller 330 of FIG. 1a is split such that some of the baseband may be integrated into one or more devices of the host computer system. The portion of the baseband that is not integrated into the host system corresponds to the Link Management Protocol, thereby making this portion available, along with the transceiver, to satisfy LMA of the DoC process.

Figure 1B:
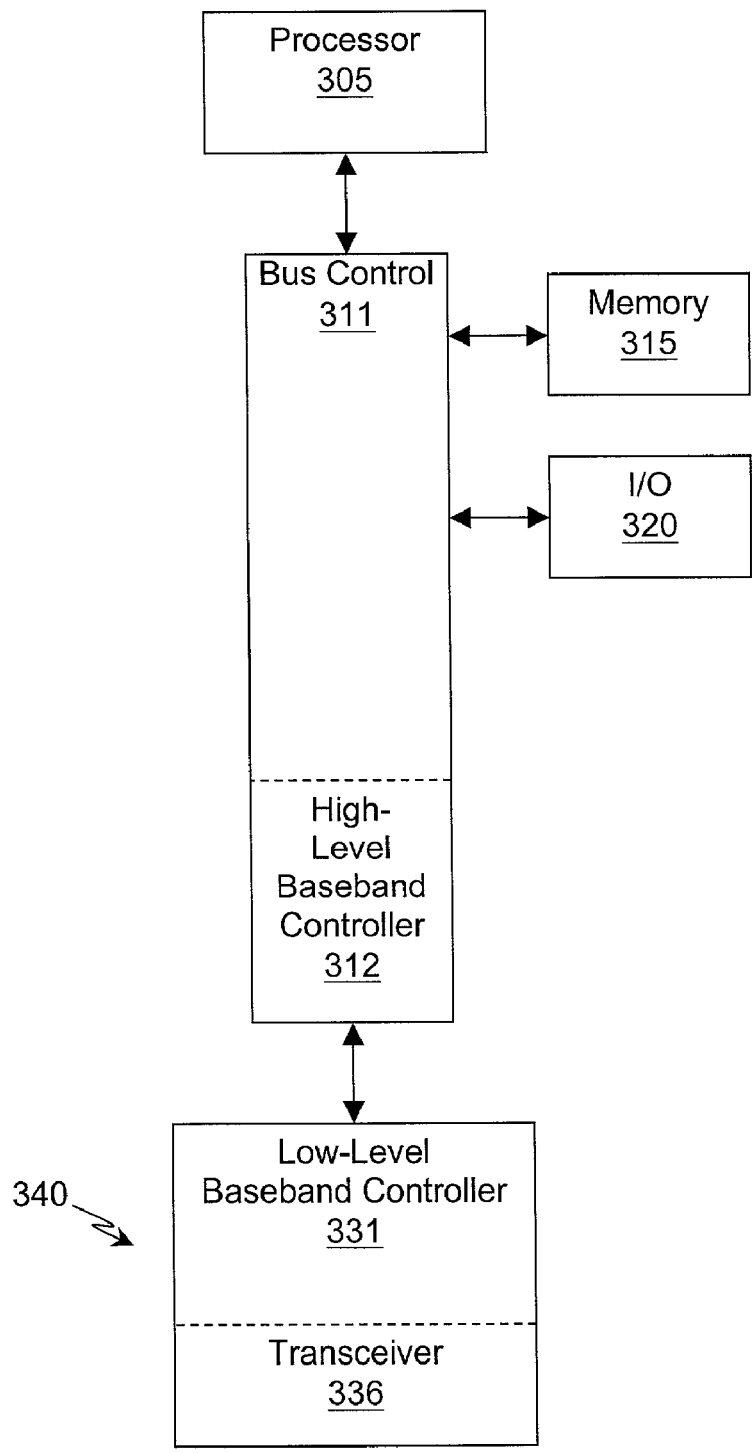

For example, consider the computer system of FIG. 1b comprising processor 305, memory 315, and I-O device 320. These elements are coupled to bus control logic 311. Bus control logic 311 includes an integrated high-level baseband controller 312 associated with the high-level portion of the Bluetooth (or other wireless communication protocol) baseband, previously contained within controller 330 of FIG. 1a. The remaining low-level portion of the baseband, previously contained within controller 330, is now contained within low-level baseband controller 331. This controller, along with transceiver 336, now constitutes new radio module 340 in accordance with an embodiment of the present invention, and this module is coupled to bus control logic 311, containing high-level baseband controller 312, via a harmonized interface.

Radio module 340 of FIG. 1b may be pre-certified by the FCC (or analogous agencies of foreign countries) using the LMA and DoC processes, and sold as an independent, add-on component to computer system manufacturers for connecting to their systems. In accordance with one embodiment of the present invention, radio module 340 includes externally accessible I-O ports coupled to I-O buffers within the module. These interconnects may be designed to be coupled to one or more components of the host computer system to enable communication between the module and the host computer system.

By designing radio module 340 of FIG. 1b generically, the module may support multiple protocols, and each may share some segment of the baseband portion contained within radio module 340. Protocol-specific baseband processing is performed in the high-level portion of the baseband, which is coordinated by high level baseband controller 312 integrated into bus control logic 311. Baseband protocol selection and operation may be controlled, at least in part, by one or more software programs that may or may not involve direct user interaction. These programs may reside, at least in part, on any machine-accessible medium such as a magnetic disk (e.g. a hard drive or floppy disk), an optical disk (e.g. a CD or DVD), a semiconductor device (e.g. Flash, EPROM, or RAM), or carrier wave, all of which are collectively represented by I-O devices 320 of FIGS. 1a–c.

In accordance with one embodiment of the present invention, the single radio module may run different protocols depending on the environment of the user. For example, while traveling a user may use the module to execute Bluetooth protocols. In the office, the user may use the module to execute IEEE 802.11 protocols, and at home the user may use the module to execute SWAP/Home-RF protocols. In accordance with another embodiment of the present invention, the module supports other wireless communication protocols that also operate in the 2.4 GHz band. Alternatively, the module may be modified to support wireless communication protocols that operate in other radio bands.

In accordance with one embodiment of the present invention, execution of the high-level baseband protocols (baseband processing) is done by (or aided by) host processor 305 of FIG. 1b, which may be modified to support real-time event processing as described below. Alternatively, all or a portion of the high-level baseband processing may be performed by control logic embedded within bus control logic 311. For an alternate embodiment of the present invention, execution of the high-level baseband protocols is done by (or aided by) a peripheral controller of the host system, as described below in conjunction with FIG. 1c.

Figure 1C:
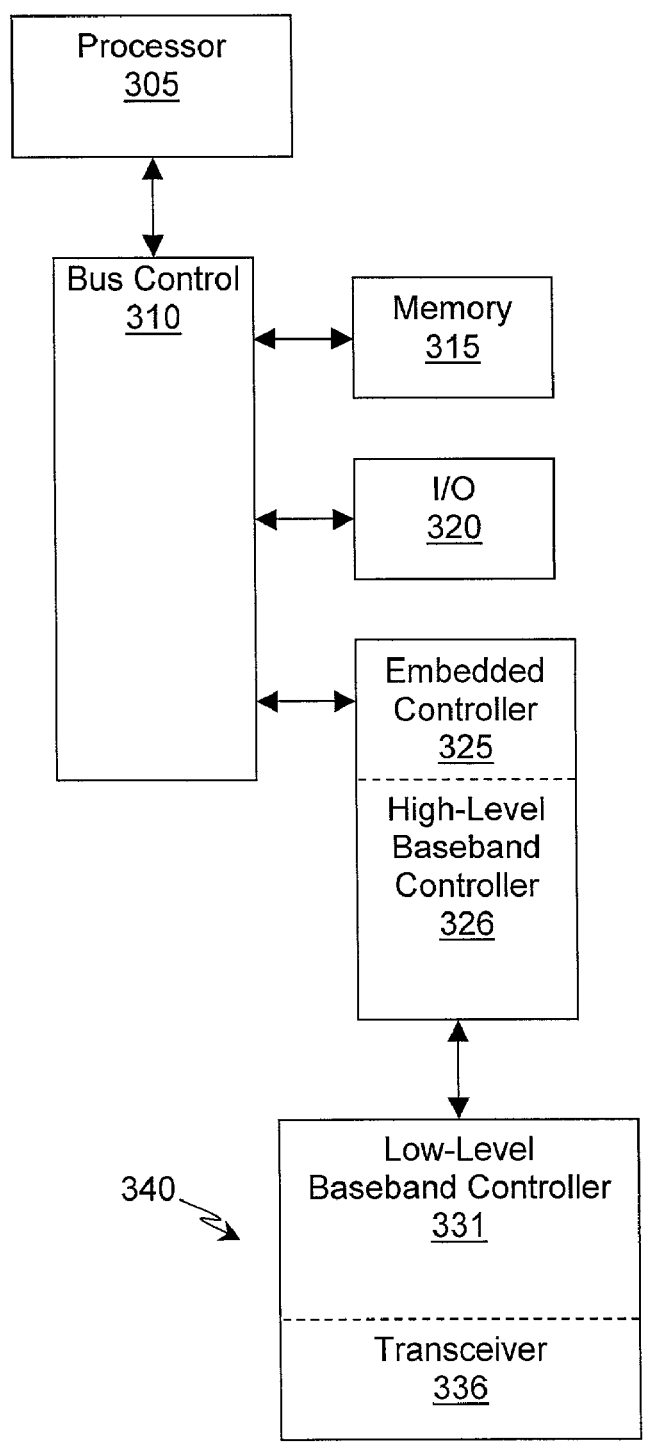

The computer system of FIG. 1c comprises processor 305, memory 315, and I-O device 320 coupled via bus control logic 310. In addition, embedded controller 325 is coupled to bus control logic 310. Embedded controller 325 may be, for example, a keyboard controller or long-range wireless controller. Embedded controller 325 includes high-level baseband controller 326 interfacing to radio module 340 via the harmonized interface. The embodiment of the present invention depicted in FIG. 1c may be found advantageous over the embodiment of FIG. 1b in that the embodiment of FIG. 1c provides for operation of the radio module even when the processor may be in a power-down (low power) state. The embodiment of FIG. 1b may be found advantageous in that baseband processing by the host processor reduces system cost because it reduces the need for a separate controller.

In addition to the features of the radio module described above, the module may include features that enable the module to receive LMA from the FCC as an intentional radiator, and its equivalent from other governments. For example, in accordance with one embodiment of the present invention, the radio module may additionally include its own reference oscillator, antenna, RF shielding, buffered data inputs, and power supply regulator.

In accordance with one embodiment of the present invention, the interconnect between the radio module and the host system components may include a flexible cable, such as a ribbon cable, that may span six inches or more. The length of such a cable may be selected to span the distance from the lid of a notebook or other mobile computer system, through the hinge of the host system to the motherboard for coupling to other components. The radio module, including its antenna, may be advantageously affixed to the lid.

Figure 1D:
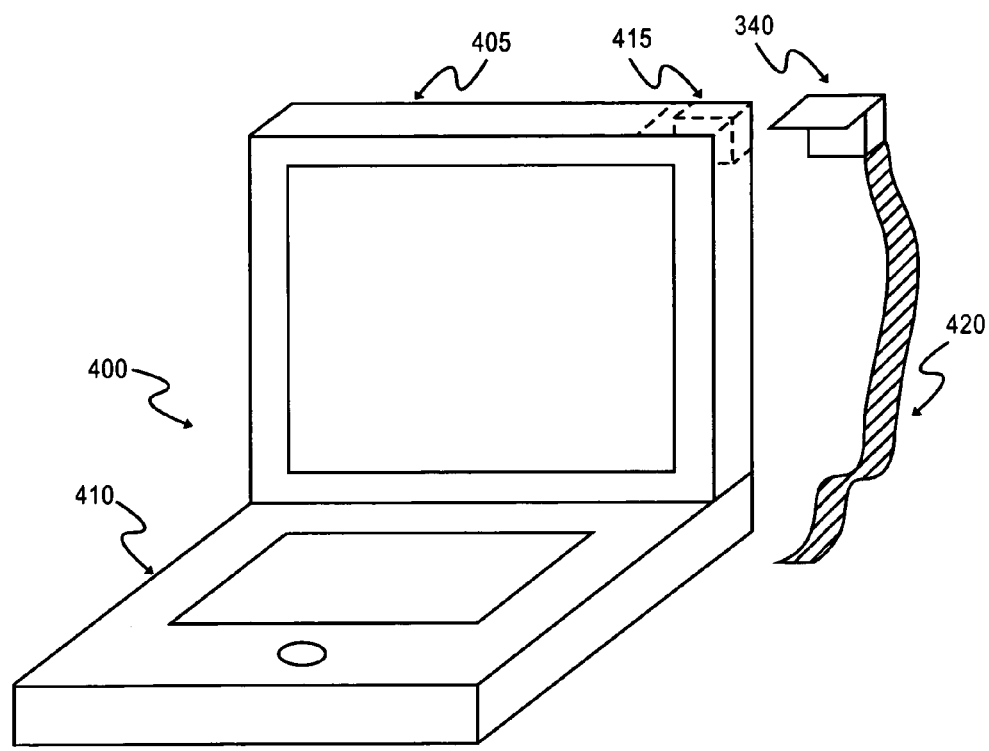

For example, FIG. 1d shows notebook computer system 400 comprising base 410 coupled to hinged lid 405. In accordance with one embodiment of the present invention, the motherboard of the computer system, containing, for example, the processor, chipset (bus control logic), main memory, and high-level baseband controller, is included in base 410 of computer system 400. Lid 405 of the computer system includes a display screen. Alternatively, a lid of an alternate computer system, such as a tablet or handheld computer system, may be any protective cover with or without a display screen or other input/output functionality.

One advantage to placing radio module 340 in lid 405 of FIG. 1d is that, during normal operation, lid 405 typically exists as the highest point in the computer system, thereby aiding in wireless communication. As shown, radio module 340 may be affixed within lid 405 at location 415, at or near the top of lid 405, with flexible cable 420 extending down through lid 405 and through the hinged coupling between lid 405 and base 410. The end of cable 420, opposite radio module 340, may then be coupled to components within base 410, such as the high-level baseband controller which may be integrated into a chipset or micro-controller of the motherboard within base 410. Note that radio module 340 and cable 420 are shown removed from lid 405 in FIG. 1d for clarity. In accordance with the embodiment described above, the radio module and cable are integrated within the lid or otherwise affixed to the lid.

Real-Time Event Processing

Note that as used herein, the term "real-time" is not intended to imply that a host system responds instantaneously to a signal generated by an external device. Rather, the term "real-time" is intended to imply sufficient determinism and sufficiently reliable latency on the part of the host system to, for example, reliably enable the establishment and maintenance of a wireless communication link with an external device. For one embodiment of the present invention, this wireless communication link may be in accordance with a Bluetooth or other wireless communication protocol. The external device may be an electronic device having an independent processor that is not under direct control of the host processor of the host system.

A primary host processor may be modified to process real-time events such as those associated with establishing a wireless communication link with an external device in accordance with a Bluetooth or other wireless communication protocol. One manner in which a conventional host processor may be modified to process these real-time events is to include a timer and a high priority event (interrupt) circuit in the host processor. This may enable a real-time kernel to run underneath an existing operating system that does not have real-time attributes. An example of an operating system that does not have real-time attributes includes the Windows* operating systems such as Windows NT, Windows 2000, Windows 98, and Windows ME (Millennium Edition).

(*Trademarks and Brands are the property of their respective owners).

This kernel may set the timer to generate the high priority event at regular intervals. Upon activation, a real-time event circuit may transfer control to a realtime event handler (kernel software) which may perform a real-time task. This handler may be used to process a wireless baseband protocol that has strict timing requirements. Additionally, this method may encompass the use of an event pin which may also generate this high priority event. The event pin may be coupled to the processor itself or to an external device coupled to the processor, such as a chipset. For an alternate embodiment of the present invention, the high priority event may be generated using a status bit stored within the processor or in an external device.

One feature of this high priority event is that it may provide more reliable latencies over conventional interrupts, reducing the risk of a high priority event latency being upset by other tasks being performed by the processor. Hence, in accordance with one embodiment of the present invention, this high priority event is one of the highest priority interrupts in the processor, although other interrupts, such as may be used for memory error handling, may be of higher priority.

Figure 2A:
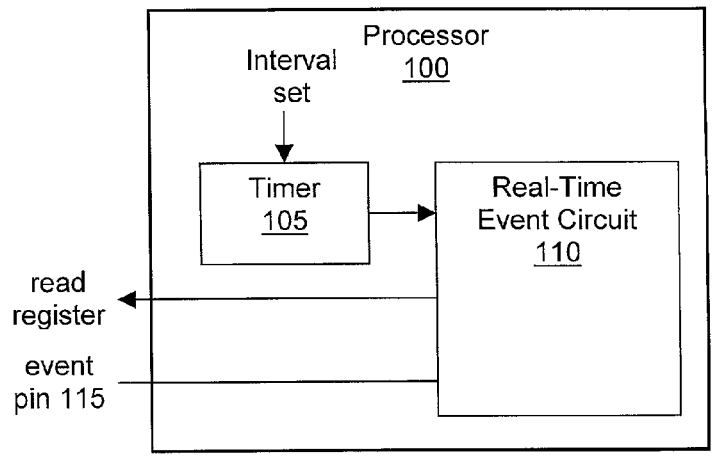
FIG. 2a is a processor formed in accordance with an embodiment of the present invention.
Figure 2B:
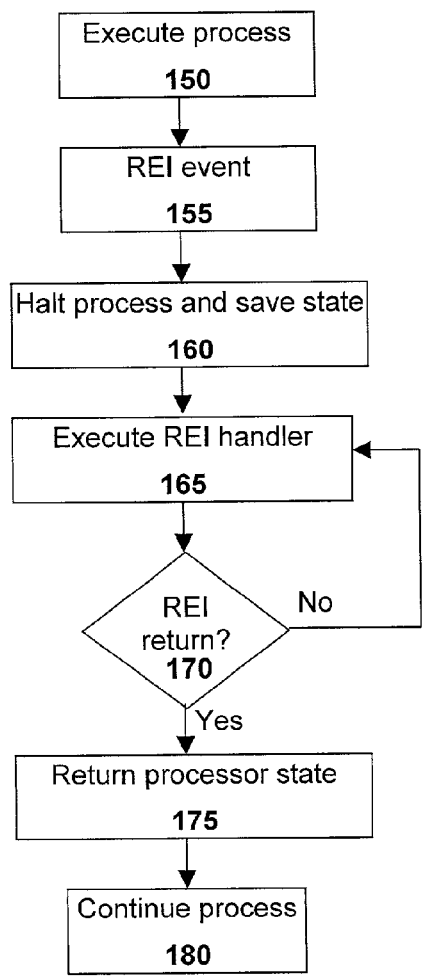
FIG. 2b is a flow chart showing a method of the present invention.

Hardware and software elements in accordance with an embodiment of the present invention are shown in FIGS. 2a and 2b, respectively. Host processor 100 includes an interval timer 105 that may be set by a software routine. The timer triggers real-time event circuit 110 to implement the method of FIG. 2b. Alternatively, interval timer 105 may trigger real-time event circuit 110 to read a register to determine if a real-time event has been received. For another embodiment, host processor 100 includes an externally accessible event pin 115 that may be used by external devices within the host computer system to trigger real-time event circuit 110 to implement the method of FIG. 2b.

In accordance with the embodiment of FIG. 2b, the processor is executing a process at step 150 when a real-time event interrupt (REI) occurs at step 155. This REI may be caused by, for example, event timer 105 expiring its set time interval or the activation of event pin 115 of host processor 100 of FIG. 2a. In response to the REI, real-time event circuit 110 causes host processor 100 to halt the process being executed at step 150 and save the processor state at step 160. The processor state may be saved to a reserved memory space.

At step 165 of FIG. 2b, host processor 100 calls and executes a REI handler. In accordance with one embodiment of the present invention, this REI handler includes instructions that, when executed by the host processor, cause the host processor to read one or more registers that store information related to the real-time event. For example, the host processor may read one or more registers that store information indicating the presence or absence of a wirelessly transmitted identification signal from an external device requesting wireless communication.

If it is determined that an external device is present and requests communication, the host processor may establish communication (or may establish a schedule for future communication) with the external device at this time. Alternatively, the host processor may, during this time, perform baseband processing functions in accordance with a wireless communication protocol as described above.

After a REI return instruction is received at step 170 of FIG. 2b, the processor state stored in the reserved memory space may be restored to the host processor, and the previous process (exited from step 150) may continue. Note that the above-described hardware and software may be implemented either with or without OS support.

In accordance with an alternate embodiment of the present invention, realtime event processing may be implemented via a secondary non-symmetric processor (NSP) integrated into the primary host processor. For this embodiment, the NSP may execute an OS that supports real-time processing separate from the primary OS executed by the primary host processor, which may not support realtime functionality. In accordance with this embodiment, the NSP may then perform the baseband processing functions in accordance with a wireless communication protocol, as described above, while the primary processor performs the regular work of the host processor for the remainder of the computer system.

Figure 3:
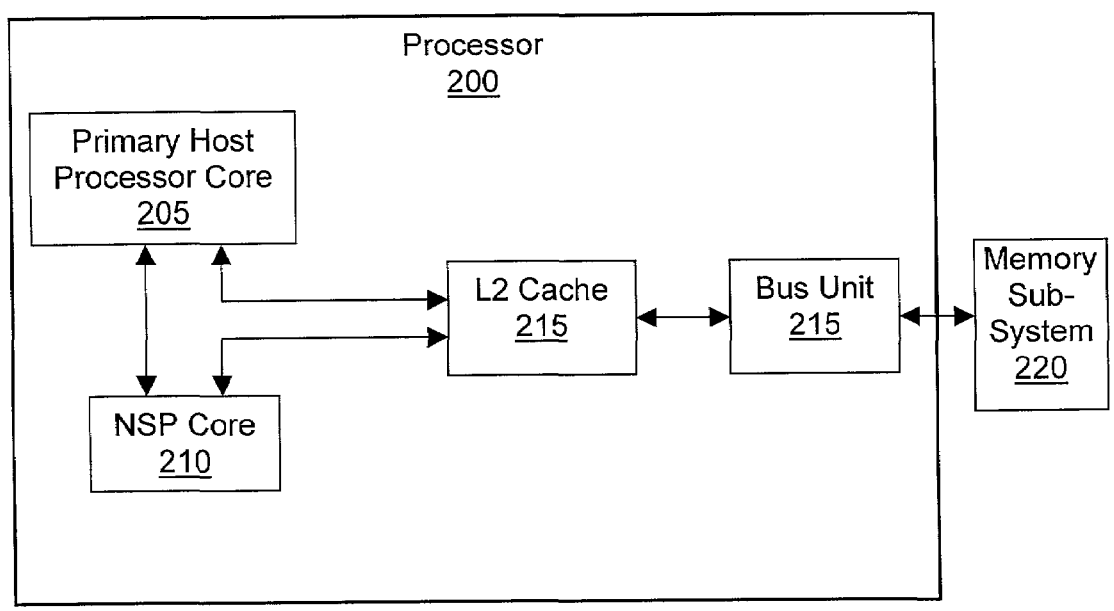
FIG. 3 is a computer system formed in accordance with an alternate embodiment of the present invention.

FIG. 3 includes a host processor 200 formed in accordance with an embodiment of the present invention in which NSP core 210 is integrated with the primary host processor core 205. In accordance with one embodiment of the present invention, the NSP core is integrated on the same semiconductor substrate as the primary host processor core to form a single processor. To reduce cost, primary host processor core 205 and NSP core 210 share L2 cache 215, and both processor cores may communicate via bus unit 215 to a shared memory subsystem 220 of the host computer system. Both cores may additionally share other system resources.

In accordance with one embodiment of the present invention, the NSP core and primary host processor core share an instruction set architecture (ISA). For an alternate embodiment of the present invention, the NSP and primary host processor cores do not share an ISA This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A mobile, uniprocessor computer system comprising:
   a high-level baseband controller to operate a radio module in accordance with a wireless communication protocol; and
   a primary host processor coupled to the high-level baseband controller, the processor having a first portion to process real-time events received from the controller and associated with the wireless communication protocol, and having a second portion to process non real-time events,
   wherein the first portion comprises a real-time event circuit to initiate execution of a real-time event handler.

2. The computer system of claim 1, wherein the first portion of the processor includes a non-symmetric processing core to run a first operating system, the second portion of the processor to run a second operating system, and the first and second portions of the processor to share a level-2 cache.

3. The computer system of claim 1, wherein the real-time event circuit is to halt a non real-time process.

4. The computer system of claim 3, wherein the first portion of the processor further includes a timer to trigger the real-time event circuit to initiate the execution of the real-time event handler.

5. The computer system of claim 3, wherein the processor includes an externally accessible event pin to trigger the real-time event circuit to initiate the execution of the real-time event handler.

6. The computer system of claim 1, wherein the non real-time events are associated with running a specific operating system.

7. The computer system of claim 1, further comprising a radio module including buffered input-output ports coupled to the high-level baseband controller, a low-level baseband controller, and a transceiver to enable wireless communication in accordance with the wireless communication protocol.

8. The computer system of claim 7, wherein the low-level baseband controller includes a baseband portion associated with a link management protocol.

9. The computer system of claim 7, further comprising a flexible cable coupled to the high-level baseband controller at a first end and coupled to the ports of the radio module at a second end.

10. The computer system of claim 9, further comprising a hinged lid into which the radio module is affixed, the flexible cable extending through a hinge between the radio module and the high-level baseband controller.

11. The computer system of claim 1, further comprising a chipset, the high-level baseband controller being incorporated into the chipset.

12. The computer system of claim 1, further comprising a keyboard controller, the high-level baseband controller being incorporated into the keyboard controller.

13. The computer system of claim 1, wherein the wireless communication protocol is selected from a group consisting of Bluetooth, SWAP, and IEEE 802.11.

14. A method comprising:
    executing a process on a primary host processor of a computer system, the process being associated with a non real-time operating system;
    receiving a real-time event by a transceiver of the computer system from an external device, the event associated with a wireless communication protocol;
    forwarding the event to the processor; and
    processing the event in real-time using a real-time event handler initiated by a real-time event circuit within the processor, the processing of the event allowing to maintain the wireless communication protocol and to perform a high-level portion of baseband processing associated with the wireless communication protocol by the processor independent of the operating system.

15. The method of claim 14, wherein a low-level portion of the baseband processing associated with the wireless communication protocol is done by a radio module independent of the processor.

16. The method of claim 15, wherein the wireless communication protocol is a Bluetooth protocol, and the low-level portion of the baseband processing is in accordance with the Bluetooth link management protocol.

17. The method of claim 14, wherein processing the event in real-time includes halting the process, saving a processor state to a reserved memory space, executing a real-time event handler, returning the processor state, and continuing execution of the process.

18. The method of claim 14, wherein processing the event in real-time includes processing the event in a first portion of the processor under a first operating system while continuing execution of the process in a second portion of the processor under a second operating system.

19. A mobile, uniprocessor computer system comprising:

a memory; and

A primary host processor coupled to the memory, the processor executing a set of instructions which cause the processor to execute a process on the primary host processor of the computer system, the process being associated with a non real-time operating system;

receive a real-time event by a transceiver of the computer system from an external device, the event associated with a wireless communication protocol;

forward the event to the processor; and process the event in real-time using a real-time event handler initiated by a real-time event circuit within the processor, the processing of the event allowing to maintain the wireless communication protocol and to perform a high-level portion of baseband processing associated with the wireless communication protocol by the processor independent of the operating system.

20. A machine-accessible medium including machine-accessible instructions that, when executed by a computer system, cause the computer system to perform a method comprising:

executing a process on a primary host processor of the computer system, the process being associated with a non real-time operating system;

receiving a real-time event by a transceiver of the computer system from an external device, the event associated with a wireless communication protocol;

forwarding the event to the processor; and processing the event in real-time using a real-time event handler initiated by a real-time event circuit within the processor, the processing of the event allowing to maintain the wireless communication protocol and to perform a high-level portion of baseband processing associated with the wireless communication protocol by the processor independent of the operating system.

21. The medium of claim 20, wherein a low-level portion of the baseband processing associated with the wireless communication protocol is done by a radio module independent of the processor wherein the wireless communication protocol is a Bluetooth protocol, and the low level portion of the baseband processing is in accordance with the Bluetooth link management protocol.

* * * * *